3,091,545
INK COMPRISING A METHACRYLATE POLYMER AND A NITROALKANE SOLVENT AND VINYL CHLORIDE POLYMER PRINTED THEREWITH
George M. Adams, Palos Heights, Ill., assignor to Union Carbide Corporation, a corporation of New York
No Drawing. Filed June 4, 1958, Ser. No. 739,684
19 Claims. (Cl. 117—38)

This invention relates to improvements in printing on plasticized polyvinyl chloride film. More particularly, the invention is concerned with high speed printing on plasticized vinyl resin film such as by flexographic presses with inks containing as the vehicle a solid polymer of an alkyl methacrylate.

Plasticization of a vinyl chloride polymer or copolymers of vinyl chloride and another monomer such as vinyl acetate, vinyl ethyl ether, acrylonitrile in which the vinyl chloride is the major constituent results in flexible, semi-elastic compositions or elastomers which can be extruded or otherwise heat-formed into transparent, substantially colorless film or sheeting. A large number of plasticizers for vinyl chloride polymers are known including simple esters such as the isomeric dioctyl phthalates, dioctyl adipate, dioctyl sebacate, tricresyl phosphate, and polymeric esters such as polypropylene glycol sebacate, polypropylene glycol adipate. Generally the plasticized composition contains from about 15 percent to 60 percent by weight of plasticizer.

A problem of long standing with film prepared from plasticized vinyl chloride polymers arises from the fact that the plasticizers are ordinarily not chemically bonded to the vinyl chloride polymer, and hence are subject to extraction when in contact with solvents which may not necessarily have any solvent action on the polymer per se. Furthermore, plasticizers, particularly those of the simple ester type, are prone to migrate and exude to the film surface, such migration being usually accelerated by exposure to moderate temperatures, e.g. 30–50° C.

Transparent films composed essentially of a plasticized polyvinyl chloride polymer are suitable for packaging food products. These films can be in the form of tubing or sheets and are suitable for the packaging of such food products as meat, cheese, oleomargarine, etc. Other uses for the films include wearing apparel such as rain coats, shower curtains, draperies, table cloths, inflated toys, and wading pools.

It is highly desirable for many reasons that the aforementioned films be printed in order to decorate or impart information. An ink to be satisfactory for printing such films must form a clear, sharp print with good covering power, adhere tenaciously to the film, and it should withstand the wrinkling, stretching, or shrinkage to which the film may be subjected during its use. Also, such an ink should have a good gloss. Furthermore, for economic reasons, such an ink should be capable of being used on high speed presses. In addition, it is highly desirable that the ink be of such a nature as not to require excessive heat or prolonged exposure to heat to effect satisfactory adherence to he film of the ink since prolonged exposure or excessive heat will cause the film to wrinkle and otherwise be shape distorted.

Heretofore, printing on plasticized vinyl polymer films on flexographic presses has been attended by offsetting and blocking of the printed surface, particularly when the printed film or tubing is re-reeled. This appears to be due in part to migration of the plasticizer from the film into the ink, and in part to solvent retention by the ink even after passage through a dryer.

Only a relatively few resins have sufficiently good adhesion to plasticized polyvinyl chloride films to be useful in printing inks. Inks made from polyvinyl chloride resins of high molecular weight as the vehicle or binder in the ink have resistance to offsetting and blocking, but these resins are not readily soluble in common solvents and furthermore yield solutions of high viscosities unsuitable for high speed flexographic printing processes. Most acrylic resins, on the other hand, are readily soluble in the ink solvent thereby giving a higher percentage of solids and also contributing to good gloss and adhesion, but are too soft and cause blocking and offsetting of the inks.

An object of this invention, therefore, is to provide a new and improved printing ink for plasticized polyvinyl chloride film and sheeting.

A further object of this invention is to provide a printed film comprising a film of plasticized polyvinyl chloride resin printed with an ink having good adherence to the film, good gloss and hiding power, and which will withstand abrasion, wrinkling, stretching, or shrinking to which the film may be subject in use.

Another obejct of this invention is to provide for printing on plasticized polyvinyl chloride film inks which do not offset or block.

A further object is to provide inks of good covering properties, relatively low viscosity, and containing solvents which do not attack rubber printing rolls.

Other and additional objects of this invention will become apparent hereinafter.

It has now been found that the aforementioned objects are realized by printing plasticized polyvinyl chloride film or sheeting with an ink comprising pigment, a vehicle or binder for the pigment being essentially a solid polymer of methyl methacrylate monomer or of ethyl methacrylate monomer, or a copolymer of these monomers and a volatile solvent for the methacrylate polymer.

These inks based on an alkyl methacrylate polymer as described above exhibit after volatilization of the solvent good gloss, excellent adhesion to the surface of plasticized polyvinyl chloride film, and are substantially free from offsetting and blocking deficiencies. In addition, the dried inks maintain their integrity against the effects of plasticizer migration and exudation and are resistant to blocking even though a small amount of solvent may still be retained in the ink for some time after printing.

Illustrative and as examples of suitable pigments for formulating inks of various colors, hues, and shades, there can be used for white inks titanium dioxide, lithopone, and zinc oxide; for black inks the carbon blacks, lamp black, and bone black are all satisfactory; for green inks phthalocyanine green and chrome green (a mixture of Prussian blue with chrome yellow) are useful; red inks can be made with the iron oxides either natural or synthetic. Permanent Red 2B such as "Watchung Red" as marketed by the E. I. du Pont de Nemours Co., lithol red, and cadmium selenide; blue pigmented inks can be had with ultramarine blue, Prusisan blue, and phthalocyanine blue; orange color pigmented inks result from the use of iron oxides and cadmium sulfide; the various raw and burnt umbers are satisfactory for brown inks; and for yellow inks cadmium yellow and zinc chromate are all suitable.

Suitable volatile solvents which can be used to dissolve the methacrylate polymer include among others, esters as for example the fatty acid esters of monohydric alcohols as exemplified by methyl acetate, ethyl acetate, ethyl propionate, isopropyl acetate, butyl acetate, and hexyl acetate; ketones such as acetone, cyclohexanone, methyl ethyl ketone, and dibutyl ketone; halogenated solvents including ethylene dichloride and methylene dichloride; and nitro-hydrocarbons such as nitromethane, nitroethane, 1-nitropropane, 2-nitropropane, 1-nitrobutane, and 2-nitrobutane.

The nitro-hydrocarbons are a preferred class of solvents for the methacrylate polymers for several reasons. The nitro-hydrocarbons in contradistinction to other solvents do not readily attack or swell printing rolls made of natural or certain synthetic rubber. The nitro-hydrocarbons form solutions of methacrylate polymers having relatively low viscosity and this is highly desirable for inks used in the flexographic printing technique. Heretofore, flexographic printing had not been widely used on vinyl film because the inks had been limited to alcohol or water-type inks since these solvents did not attack the rubber rollers or engravings used in this process.

A considerable portion of a lower aliphatic monohydric alcohol such as methyl alcohol, isopropyl alcohol, ethyl alcohol, or any of the isomeric butyl alcohols may be used with the nitroparaffins to form solvent mixtures which have still less effect than nitroparaffins per se in causing swelling of rubber printing rolls. Moreover, these solvent mixtures do not dissolve or swell the base film of plasticized vinyl chloride resin.

Most surprising is the discovery that solvent mixtures of a monohydric alcohol and a nitroparaffin, particularly nitromethane, when used to dissolve methyl or ethyl methacrylate polymers result in solutions having a much lower viscosity than when the nitroparaffin is used as the sole solvent.

The synergistic effect of various alcohols in combination with a nitroalkane in yielding low viscosity methyl methacrylate polymer solutions is demonstrated by the data in subsequent Tables I, II and III wherein are given viscosity values of 15 percent by weight solutions of "Lucite 41" a commercial methyl methacrylate polymer marketed by the E. I. du Pont de Nemours Co. having the following properties:

Viscosity of a 17.5% by weight solution in toluene
at 25° C. by No. 15 Parlin Cup [1] _____sec___ 40–70
Density at 25° C. _____ 1.19
Refractive index _____ 1.493

[1] The Parlin Cup method for determining viscosity is described in Gardner and Swards, "Physical and Chemical Examination; Paints, Varnishes, Lacquers, Colors," 11th Edition (1950), page 312.

TABLE I

| Percent by weight Nitromethane | Percent by weight anhydrous ethanol | Viscosity of 15% by weight of "Lucite 41" solution in cps. at 25° C. |
| --- | --- | --- |
| 100 | 0 | 39,000 |
| 85 | 15 | 2,870 |
| 75 | 25 | 1,670 |
| 65 | 35 | 1,050 |
| 60 | 40 | 1,300 |
| 55 | 45 | 1,890 |
| 50 | 50 | 2,170 |
| 25 | 75 | (1) |
| 0 | 100 | (2) |

[1] Insoluble and swells.
[2] Insoluble.

TABLE II

| Percent by weight Nitromethane | Percent by weight isopropyl alcohol 99% | Viscosity of 15% by weight of "Lucite 41" solution in cps. at 25° C. |
| --- | --- | --- |
| 75 | 25 | 1,365 |
| 65 | 35 | 870 |
| 55 | 45 | 1,200 |
| 50 | 50 | 1,330 |
| 40 | 60 | 2,600 |
| 35 | 65 | 4,770 |

With less than 50 percent nitromethane a cloudy and gelatinous film occurs on exposure to air.

The viscosity data reported in subsequent Table III was obtained on a different sample of "Lucite 41" than that used in Tables I and II.

TABLE III

| Percent by weight nitroalkane | Percent by weight alcohol | Viscosity of 15% by weight of "Lucite 41" solution in cps. at 25° C. |
| --- | --- | --- |
| Nitromethane_____100 | | 35,200 |
| Nitroethane_____100 | | 3,750 |
| 2-nitropropane_____100 | | 4,170 |
| Nitromethane_____95 | Anhydrous ethanol___5 | 9,760 |
| Nitromethane_____90 | Anhydrous ethanol__10 | 4,300 |
| Nitromethane_____95 | Isopropanol_____5 | 13,600 |
| Nitromethane_____90 | Isopropanol_____10 | 5,250 |
| 2-nitropropane_____65 | Isopropanol_____35 | 3,200 |

Alcohols exert a reducing effect on viscosity with 2-nitropropane also but since the original viscosity is lower than nitromethane, the effect is not so great.

Solution of the methacrylate polymer in nitromethane with or without alcohols takes place in a few minutes, whereas several hours are required with 2-nitropropane with or without alcohol. Nitroethane is a little slower than nitromethane.

The methacrylate polymers, e.g. of methyl methacrylate homopolymer or of ethyl methacrylate homopolymer, or a copolymer of these two monomers are solid polymers, and preferably have average molecular weights of at least about 40,000 and being further characterized by solubility in at least one of the organic solvents previously described.

The methyl and ethyl methacrylate resins used as ink vehicles combine the necessary hardness and solvent released to prevent blocking and offsetting and in addition with their good solubility in solvents, high solids content inks are feasible which provide good gloss and printing qualities. The degree of hardness required is determined by conducting a blocking test on the print. The dried ink surface is placed in contact with a piece of unprinted film and the resulting "sandwich" is placed under a weight of 1¼ lbs./sq. in. in an oven at 49° C. for 24 hours. No sticking or offsetting should occur when the cooled surfaces are separated.

The ink composition can be readily prepared by first dissolving the solid methacrylate polymer in an amount of solvent to form a fluid solution. Pigment matter is added to the solution, initial dispersion of pigment in the solution being usually, but not necessarily, accomplished by pony mixers or similar equipment. Thereafter, complete dispersion of the pigment matter is effected on conventional equipment such as three or four roll mills or ball mills. Because the solvents in the solution are quite volatile, the use of ball mills is desirable to avoid loss of solvents during mixing.

A preferred method of preparing the inks of this invention makes use of pigmented chips prepared by fluxing the methacrylate polymer on a hot two roll mill and then dispersing the pigment matter into the fluxed polymer. The resultant pigmented sheet formed on the rolls is removed, and after cooling, is broken up into chips. To form a coating solution, the chips are dissolved with the aid of agitation in a suitable solvent or solvent mixture as herein described. The chip method generally results in inks of better gloss and higher pigmentation.

The relative amounts of pigment, solvent, and binder or vehicle of methacrylate polymer in the final ink are not critical and can be chosen to meet desired properties of color, shade, and viscosity. Enough binder should be present, however, in the ink to form with the pigment matter a continuous adherent film upon drying of the ink composition.

The preferred quantity of methacrylate polymer in the ink composition is such that it constitutes between 20 percent and 75 percent by weight of the total solids in the ink.

All the ink compositions herein described and contemplated can be dried to a non-tacky film either after exposure to normal room temperatures or to relatively mild elevated temperatures of up to about 50° C., this being about the maximum possible temperature which can be used over an extended period without causing distortion of the plasticized vinyl polymer. Higher drying temperatures than 50° C. can be used when flash-heating procedures are used to minimize heat distortion changes of the vinyl film; for example, most vinyl film will tolerate a flash heat of 70–100° C. for 1 to 30 seconds.

Although printing on vinyl film by means of the flexographic process has been previously mentioned, the ink compositions herein contemplated can be used in other conventional printing processes for vinyl film, among which are gravure printing, spanishing where ink is wiped into depressed areas of embossed films, tipping or topping whereby ink is wiped onto the high spots of embossed film, valley printing involving simultaneously embossing and printing, and which, like flexographic printing, had been limited to the use of alcohol or water-soluble inks to prevent attack of the rubber rolls, transfer printing which prints first on a carrier material such as paper from which it is then transferred to the vinyl film, stencil printing through a punched metal sheet, and screen printing using a silk or nylon cloth as pattern through which the ink is passed.

The illustrative embodiments of the invention in the following examples are not to be construed in restriction of the invention except as defined in the appended claims. All proportions and parts in the following examples are understood as being by weight unless otherwise stated.

*Example 1.—White Ink*

A white ink was prepared by ball milling together for 24 hours the following materials:

| | Parts |
|---|---|
| Titanium dioxide | 21.2 |
| Solid methyl methacrylate polymer ("Lucite 41") | 14.1 |
| 2-nitropropane | 64.7 |

The resultant ink was a smooth-flowing liquid having a viscosity of 3000 centipoises at 25° C.

A film of plasticized vinyl chloride polymer was printed on a flexographic press with the ink described above. The printed film was passed through a hot air dryer wherein it was subjected to temperatures between about 76° C. and 88° C. for 12 to 20 seconds to flash off the solvent. These drying temperatures and times caused no deleterious effect on the film. The printed film was reeled immediately.

The prints had good covering power, good gloss, and satisfactorily adhered to the film. In addition, no sticking or offsetting occurred when the printed film was reeled. Furthermore, the printed film exhibited no sticking or offsetting when placed in contact with an unprinted plasticized vinyl film for 24 hours under the test conditions previously described.

*Example 2.—Red Ink*

A red ink was prepared by ball milling together for 48 hours the following materials:

| | Parts |
|---|---|
| Permanent Red 2B | 12.6 |
| Solid methyl methacrylate polymer ("Lucite 41") | 17.4 |
| 2-nitropropane | 70.0 |

The resultant ink had a viscosity of 2500 cps. at 25° C.

A plasticized vinyl chloride film was printed with this ink by the flexographic process and reeled by the same method as described in Example 1.

*Example 3.—White Ink*

A white ink was prepared in the same manner described in the previous examples from the following materials:

| | Parts |
|---|---|
| Titanium dioxide | 43.8 |
| Solid ethyl methacrylate polymer (Lucite 42) [1] | 14.6 |
| 2-nitropropane | 41.6 |

[1] "Lucite 42" is a solid ethyl methacrylate polymer marketed by the E. I. du Pont de Nemours Co. and having the following properties:

| | |
|---|---|
| Viscosity of a 31% by weight solution in toluene at 25° C. by No. 15 Parlin Cup _____ sec. | 40–70 |
| Density at 25° C. | 1.12 |
| Refractive index at 25° C. | 1.484 |

The resultant ink had a viscosity of 2750 cps. at 25° C.

A plasticized vinyl chloride polymer was printed and reeled by the same method as described in Example 1. The properties of the dried film were similar to those obtained in Example 1.

*Example 4.—Red Ink*

A red ink was prepared according to the method described in Example 1 from the following materials:

| | Parts |
|---|---|
| Permanent Red 2B | 6.25 |
| Solid ethyl methacrylate polymer (Lucite 42) | 18.75 |
| 2-nitropropane | 75.00 |

The resultant ink had a viscosity of 2000 cps. at 25° C.

A film of plasticized vinyl chloride polymer was printed and reeled by the same method as described in Example 1. The properties of the dried film were similar to those obtained in Example 1.

*Example 5.—White Ink*

A white ink was prepared using the following formulation:

| | Parts |
|---|---|
| Titanium dioxide | 90 |
| Solid methyl methacrylate polymer (Lucite 41) | 60 |
| Nitromethane | 144 |
| Isopropyl alcohol | 96 |

This ink printed well on plasticized polyvinyl chloride film and had practically no effect on the rubber rolls or the film.

As shown by the preceding examples, the ink vehicle in the preferred embodiment of this invention consists essentially of a solvent-soluble, solid methyl or ethyl methacrylate polymer. Furthermore, either polymer can be used separately, but mixtures of the two resins are incompatible. However, when the monomers are copolymerized in any proportions, such can be used satisfactorily as binders for ink compositions. Solid copolymers containing respectively 20%, 50%, and 80% of ethyl methacrylate have all been found useful as ink vehicles.

It was also found that methacrylate polymers in the homologous series beyond ethyl methacrylate were too soft and therefore did not give satisfactory inks.

The plasticized vinyl chloride polymer film employed in the previous examples was prepared by milling together at about 160° C. the following materials:

| | Parts |
|---|---|
| Commercial solid vinyl chloride polymer | 100 |
| Dioctyl phthalate | 25 |
| Octyl diphenyl phosphate | 15 |
| Epoxy-containing polymeric plasticizer (Paraplex G, Rohm & Haas Co.) | 7 |
| Barium-cadmium laurate | 2.25 |

The hot plastic mix was then hot-calendered into film of 0.004 inch average thickness.

The invention is not to be construed as limited to printing on a vinyl chloride polymer film as immediately above described, such film being merely a typical example of plasticized vinyl film.

Other plasticized vinyl chloride polymers can be used equally as well to prepare printable film including vinyl acetate-vinyl chloride copolymers containing 80 percent or more of vinyl chloride. Furthermore, other plasticizers including those previously mentioned herein, stabilizers, and fillers can be substituted for the like components in the specific vinyl film herein employed to demonstrate the invention.

The plasticized vinyl films need not necessarily be clear film, but may be otherwise colored as by the inclusion of dyes or pigment matter.

Accordingly, it is obvious that various changes may be made in formulating the inks and their application to a thermoplastic film without departing from the nature and concept of the invention, and hence the invention is not to be restricted except as set forth in the appended claims.

What is claimed is:

1. Plasticized vinyl chloride polymer film containing a solvent extractable plasticizer and printed with an ink consisting essentially of pigment and as a binder for the pigment, a solid, solvent soluble methacrylate polymer selected from the group consisting of methyl methacrylate homopolymer, ethyl methacrylate homopolymer, and copolymers of methyl methacrylate and ethyl methacrylate, said printed surfaces being substantially free from offsetting and blocking.

2. Printed plasticized vinyl chloride polymer film according to claim 1 wherein the ink binder is a solid methyl methacrylate polymer.

3. Printed plasticized vinyl chloride polymer film according to claim 1 wherein the ink binder is ethyl methacrylate homopolymer.

4. Printed plasticized vinyl chloride polymer film according to claim 1 wherein the ink binder is a copolymer of methyl methacrylate and ethyl methacrylate.

5. Printed plasticized vinyl chloride polymer film according to claim 1 wherein the methacrylate homopolymer constitutes between 20 percent and 75 percent by weight of the total ink solids.

6. Method for forming a non-offsetting, non-blocking printed surface on a film of plasticized vinyl chloride polymer plasticized with a solvent extractable plasticizer which comprises printing on said film with an ink consisting essentially of pigment matter, a methacrylate polymer selected from the group consisting of methyl methacrylate homopolymer, ethyl methacrylate homopolymer, and copolymers of methyl methacrylate and ethyl methacrylate, and as a volatile organic solvent for the methacrylate polymer a nitroalkane, and then drying the printed matter to remove the volatile solvent.

7. Method of printing on plasticized vinyl film according to claim 6 wherein the volatile organic solvent is 2-nitropropane.

8. Method of printing on plasticized vinyl film according to claim 6 wherein the solvent is removed by flash heating at an elevated temperature within a time cycle insufficient to cause distortion of the film.

9. Method of printing on plasticized vinyl film according to claim 8 wherein the flash drying of the ink is effected by heating the printed film for 10 to 20 seconds at a temperature between 76° C. and 88° C.

10. A non-offsetting, non-blocking ink for printing on plasticized vinyl chloride film plasticized with a solvent extractable plasticizer, said ink consisting essentially of pigment, a solid methacrylate polymer selected from the group consisting of methyl methacrylate homopolymer, ethyl methacrylate homopolymer, and copolymers of methyl methacrylate and ethyl methacrylate, and as a volatile organic solvent for the methacrylate polymer a nitroalkane.

11. A printing ink according to claim 10 wherein the methacrylate polymers constitute between 20 and 75 percent by weight of the total ink solids.

12. A printing ink according to claim 10 wherein the methacrylate polymer is a solid polymer of methyl methacrylate.

13. A printing ink according to claim 10 wherein the polymer is polymerized ethyl methacrylate.

14. A printing ink according to claim 10 wherein the solvent is 2-nitropropane.

15. A printing ink according to claim 10 wherein the solvent is nitroethane.

16. A printing ink according to claim 10 wherein the solvent is nitromethane.

17. A printing ink composition according to claim 10 wherein the solvent is a mixture of a saturated, lower aliphatic monohydric alcohol and a nitropropane.

18. A printing ink composition according to claim 10 wherein the solvent is a mixture of a saturated, lower aliphatic monohydric alcohol and nitromethane.

19. A coating material consisting essentially of a solid methacrylate polymer selected from the group consisting of methyl methacrylate polymer, ethyl methacrylate polymer and copolymers of methyl methacrylate and ethyl methacrylate in solution in a solvent mixture comprising a saturated lower aliphatic alcohol and a nitroalkane.

References Cited in the file of this patent

UNITED STATES PATENTS

| | | |
|---|---|---|
| 2,337,635 | Bogin | Dec. 28, 1943 |
| 2,366,414 | Lindh | Jan. 2, 1945 |
| 2,622,991 | Sturm | Dec. 23, 1952 |
| 2,705,690 | Nelson et al. | Apr. 5, 1955 |
| 2,745,814 | Gilbert et al. | May 15, 1956 |
| 2,934,512 | Godshalk | Apr. 26, 1960 |
| 2,974,057 | Adams | Mar. 7, 1961 |
| 2,990,386 | Roney | June 27, 1961 |